(12) United States Patent
Belokonskiy

(10) Patent No.: US 11,812,171 B2
(45) Date of Patent: Nov. 7, 2023

(54) ELECTRONIC DEVICE, METHOD AND COMPUTER PROGRAM

(71) Applicant: Sony Semiconductor Solutions Corporation, Kanagawa (JP)

(72) Inventor: Victor Belokonskiy, Zaventem (BE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 16 days.

(21) Appl. No.: 17/279,499

(22) PCT Filed: Oct. 25, 2019

(86) PCT No.: PCT/EP2019/079156
§ 371 (c)(1),
(2) Date: Mar. 24, 2021

(87) PCT Pub. No.: WO2020/089062
PCT Pub. Date: May 7, 2020

(65) Prior Publication Data
US 2021/0392282 A1    Dec. 16, 2021

(30) Foreign Application Priority Data
Oct. 31, 2018  (EP) .................................. 18203782

(51) Int. Cl.
*H04N 25/70* (2023.01)
*H04N 25/705* (2023.01)
*G01S 17/894* (2020.01)
*G01S 7/4863* (2020.01)
*H04N 25/75* (2023.01)

(52) U.S. Cl.
CPC ......... *H04N 25/705* (2023.01); *G01S 7/4863* (2013.01); *G01S 17/894* (2020.01); *H04N 25/75* (2023.01)

(58) Field of Classification Search
CPC .. H04N 5/36965; H04N 5/378; G01S 17/894; G01S 7/4863
See application file for complete search history.

(56) References Cited

U.S. PATENT DOCUMENTS 6,943,771 B2   9/2005   Kabel et al.
9,236,705 B2   1/2016   Deppe
(Continued)

FOREIGN PATENT DOCUMENTS

DE   10 2012 204512 A1   9/2013
DE   10 2015 202501 A1   8/2016
(Continued)

OTHER PUBLICATIONS

International Search Report and Written Opinion dated Jan. 28, 2020 in connection with International Application No. PCT/EP2019/079156.
(Continued)

*Primary Examiner* — Twyler L Haskins
*Assistant Examiner* — Fayez A Bhuiyan
(74) *Attorney, Agent, or Firm* — Wolf, Greenfield & Sacks, P.C.

(57) ABSTRACT

An electronic device (200) having an array of pixels (210; 400; 500; 810), and pixel modulation drivers (D1 to D8), each pixel modulation drivers (D1 to D8) being configured to drive a sub-array (R1 to R8) of the pixels.

18 Claims, 8 Drawing Sheets

(56) References Cited

U.S. PATENT DOCUMENTS

| | | |
|---|---|---|
| 9,558,563 B1 | 1/2017 | Kamarshi et al. |
| 9,571,764 B2 * | 2/2017 | Choi .................... H04N 25/767 |
| 2005/0117017 A1 | 6/2005 | Baer |
| 2008/0024060 A1 | 1/2008 | Jonnalagadda et al. |
| 2009/0020687 A1 * | 1/2009 | Lehmann ................ G01S 17/42 |
| | | 250/208.1 |

FOREIGN PATENT DOCUMENTS

| | | |
|---|---|---|
| DE | 10 2016 205073 A1 | 10/2016 |
| EP | 2788717 A1 | 10/2014 |
| EP | 2973418 A1 | 1/2016 |

OTHER PUBLICATIONS

[No Author Listed], OPT8230 3D Time-of-Flight Sensor. Texas Instruments. Dec. 2015. 89 pages.
Griffiths et al., CMOS-integrated GaN LED array for discrete power level stepping in visible light communications. Optics express. Apr. 17, 2017;25(8):A338-45.

* cited by examiner

ELECTRONIC DEVICE, METHOD AND COMPUTER PROGRAM

CROSS-REFERENCE TO RELATED APPLICATIONS

This application claims the benefit under 35 U.S.C. § 371 as a U.S. National Stage Entry of International Application No. PCT/EP2019/079156, filed in the European Patent Office as a Receiving Office on Oct. 25, 2019, which claims priority to European Patent Application Number EP18203782.0, filed in the European Patent Office on Oct. 31, 2018, each of which is hereby incorporated by reference in its entirety.

TECHNICAL FIELD

The present disclosure generally pertains to the field of electronic devices, in particular imaging devices and methods for imaging devices.

TECHNICAL BACKGROUND

A time-of-flight camera is a range imaging camera system that determines the distance of objects measuring the time-of-flight (ToF) of a light signal between the camera and the object for each point of the image. A time-of-flight camera thus receives a depth map of a scene. Generally, a time-of-flight camera has an illumination unit that illuminates a region of interest with modulated light, and a pixel array that collects light reflected from the same region of interest. As individual pixels collect light from certain parts of the scene, a time-of-flight camera may include a lens for imaging while maintaining a reasonable light collection area.

A typical ToF camera pixel develops a charge that represents a correlation between the illuminated light and the backscattered light. To enable the correlation between the illuminated light and the backscattered light, each pixel is controlled by a common demodulation input coming from a mixing driver. The demodulation input to the pixels is synchronous with an illumination block modulation.

Although there exist demodulation techniques for time-of-flight cameras, it is generally desirable to provide better demodulation techniques for a time-of-flight camera.

SUMMARY

According to a first aspect the disclosure provides an electronic device comprising an array of pixels, and pixel modulation drivers, each pixel modulation drivers being configured to drive a sub-array of the pixels.

According to a second aspect, the disclosure provides a time-of-flight camera comprising the electronic device to the first aspect.

According to a third aspect, the disclosure provides a method of driving an electronic device comprising an array of pixels and pixel modulation drivers, the method comprising driving, with each of the multiple pixel modulation drivers, a respective sub-array of the pixels.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
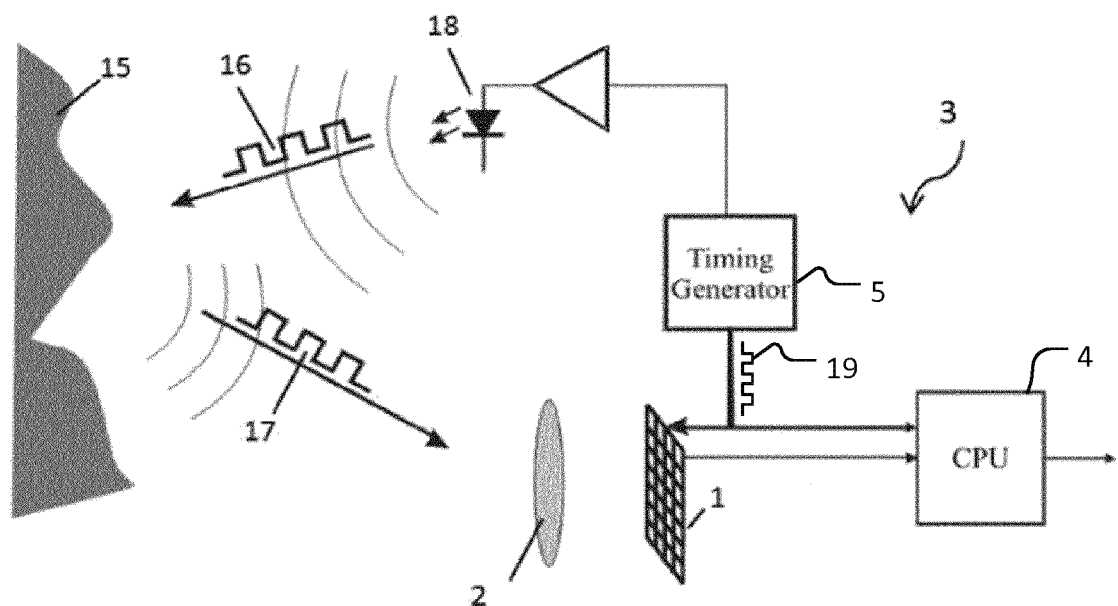
FIG. 1 illustrates schematically the basic operational principle of a ToF camera.

Before a detailed description of the embodiments under reference of FIG. 1, general explanations are made.

The embodiments described below provide an electronic device comprising an array of pixels, and pixel modulation drivers, each pixel modulation drivers being configured to drive a sub-array of the pixels.

The electronic device may be an image sensor for collecting a light. The image sensor may for example comprise several pixels for collecting the light. The pixels of the image sensor may build a pixel array.

The pixel may be a photo sensor or photo detector that converts light into a current.

The electronic device may for example be an image sensor for a time of flight camera which is a range imaging camera that determines the distance of objects measuring the time of flight (ToF) of a light signal between the camera and the object for each point of the image. For example, an indirect time of flight camera (iToF) measures a phase delay which results from a correlation of the illumination signal with a modulation signal.

The driver may generate a modulation signal for an illumination unit and a demodulation signal for pixels of the imaging sensor The pixel modulation drivers may for example be distributed where each pixel gets an individual driver with individual enable control, therefore, a customized shape of sub-array may be obtained with optimal power consumption.

Driving of modulation signals for ToF sensor pixel may be a significant contributor to overall power consumption of ToF camera due to the distributed load, high switching frequency and strict requirements to switching time. Increasing size of pixel array and demand for higher modulation frequencies may lead to even higher peak current required for modulation which can be an important challenge for IC design (electromigration constrains) and system level implementation (EMC constrains). Also, some applications (e.g. known scene surveillance) and acquisition methods (e.g. zone ToF similar to rolling shutter and spot ToF with partially illuminated scene) does not require full frame acquisition, so a lot of power is wasted by modulating full image frame.

In some embodiments each pixel sub-array receives an individual demodulation signal and each pixel of a sub-array is controlled with an individual enable control signal.

The column enable lines may receive control signal from an enable control to activate or deactivate a specific line of the pixel array, the activated pixels may be demodulated.

In some embodiments the sub-arrays of the pixels correspond to the rows or columns of the array of pixels.

Individual driver may be provided for every row (column) and enable controls may be provided for every column (row), driver may have a separated individual enable control.

Alternatively, a driver may be arranged to more than one column or row line of the pixel array.

In some embodiments the sub-arrays of the pixels correspond to 2×2 pixel arrays.

In some embodiments the dedicated pixel modulation driver allows to drive any rectangular region of interest (RoI) or regular region of interest matrix.

In some embodiments enable lines are provided for enabling or disabling pixels of the array of pixels.

In some embodiments column enable lines are provided for enabling or disabling pixels of a specific pixel column.

In some embodiments pixel modulation drivers are configured to generate a demodulation signal.

The modulation signal may for example be a square wave with a frequency of 10 to 100 MHZ.

In some embodiments pixel modulation drivers are arranged to drive the sub-array according to a multiphase driving scheme.

The entire pixel array or selected sub-array may be demodulated with multi-phase modulation signal which will distribute switching moment of multiple drivers in time. Each modulation signal may have a phase different from a phase offset to the next modulation signal that is provided to the adjacent driver.

Driving an electronic device by multiphase driving scheme may reduce an amplitude of a peak switching current factor equal to number of phases. The switching driving current may be the current that is applied to the pixels of the electronic device. When a reduced switching driver current is applied to each of the electrical lines that is electrically connected with the pixels, the electromagnetic interference (EMI) between adjacent electrical line may be reduced.

In some embodiments the pixel modulation drivers are arranged to drive the sub-arrays with demodulation signals having a different phase offset.

The phase of the next demodulation signal may for example have a phase shift of 90°.

In some embodiments the electronic device provides a sub-readout mode in which one or more sub-arrays of the array of pixel are read out.

To obtain a phase data of the reflected light, each pixel has an integration phase and a read out phase. In the integration phase, a light is changed to a current and it is correlated with a demodulation signal generated by a respective driver. The resulted correlated signal is stored in a respective storage unit, i.e. capacitor. In the read out phase the stored signal is read out.

The electronic device may have different read-out mode, where the read out time may be different for each read out-mode.

In some embodiments the sub read-out mode is configured to provide a spot subsampling. In case of spot ToF, it may be not optimal to read full pixel array at high fps due to high noise in valley. Method of improving power efficiency of ToF camera using spot type of illumination while improving motion robustness.

In some embodiments the sub read-out mode is configured to subsample a sub-array of the array of pixels where a high intensity of light is received.

In some embodiments the electronic device further provides a full read-out mode in which the entire array of pixels is read out.

In some embodiments sub read-out mode has a higher frame rate than the full read-out mode.

In some embodiments the electronic device further comprises switches that are connected to respective pixels, each switches being controlled by a respective column enable signal and each switch connecting or disconnecting the respective pixel to or from a respective pixel modulation driver.

The switch may be a metal-oxide-semiconductor field-effect transistor (MOSFET) and may be configured to deliver the demodulation signal to the pixels based on the activation of the respective enable controls and drivers.

In some embodiments the image sensor has a QVGA pixel array.

In some embodiments the electronic device is an imaging sensor for a time-of-flight camera.

The embodiments also disclose a time-of-flight camera comprising the electronic device.

The embodiments also disclose a method of driving an electronic device comprising an array of pixels and pixel modulation drivers, the method comprising driving, with each of the multiple pixel modulation drivers, a respective sub-array of the pixels.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed FIG. 1 illustrates schematically the basic operational principle of a time-of-flight (ToF) camera. The ToF camera 3 captures 3D images of a scene 15 by analyzing the time-of-flight of light from a dedicated illumination unit 18 to an object. The ToF camera 3 includes a camera, for instance an imaging sensor 1 and a processor 4. A scene 15 is actively illuminated with a modulated light 16 at a predetermined wavelength using the dedicated illumination unit 18, for instance with some light pulses of at least one predetermined frequency generated by a timing generator 5. The modulated light 16 is reflected back from objects within the scene 15. A lens 2 collects the reflected light 17 and forms an image of the objects onto the imaging sensor 1 of the camera. Depending on the distance of objects from the camera, a delay is experienced between the emission of the modulated light 16, e.g. the so-called light pulses, and the reception at the camera of those reflected light pulses 17. Distances between reflecting objects and the camera may be determined as function of the time delay observed and the speed of light constant value.

In indirect time-of-flight (iToF) cameras calculate a delay between modulated light 16 and reflected light 17 for obtaining depth measurements by sampling a correlation wave, e.g. between a demodulation signal 19 generated by the timing generator 5 and the reflected light 17 that is stored in the imaging sensor 1.

Distributed VMIX

Figure 2:
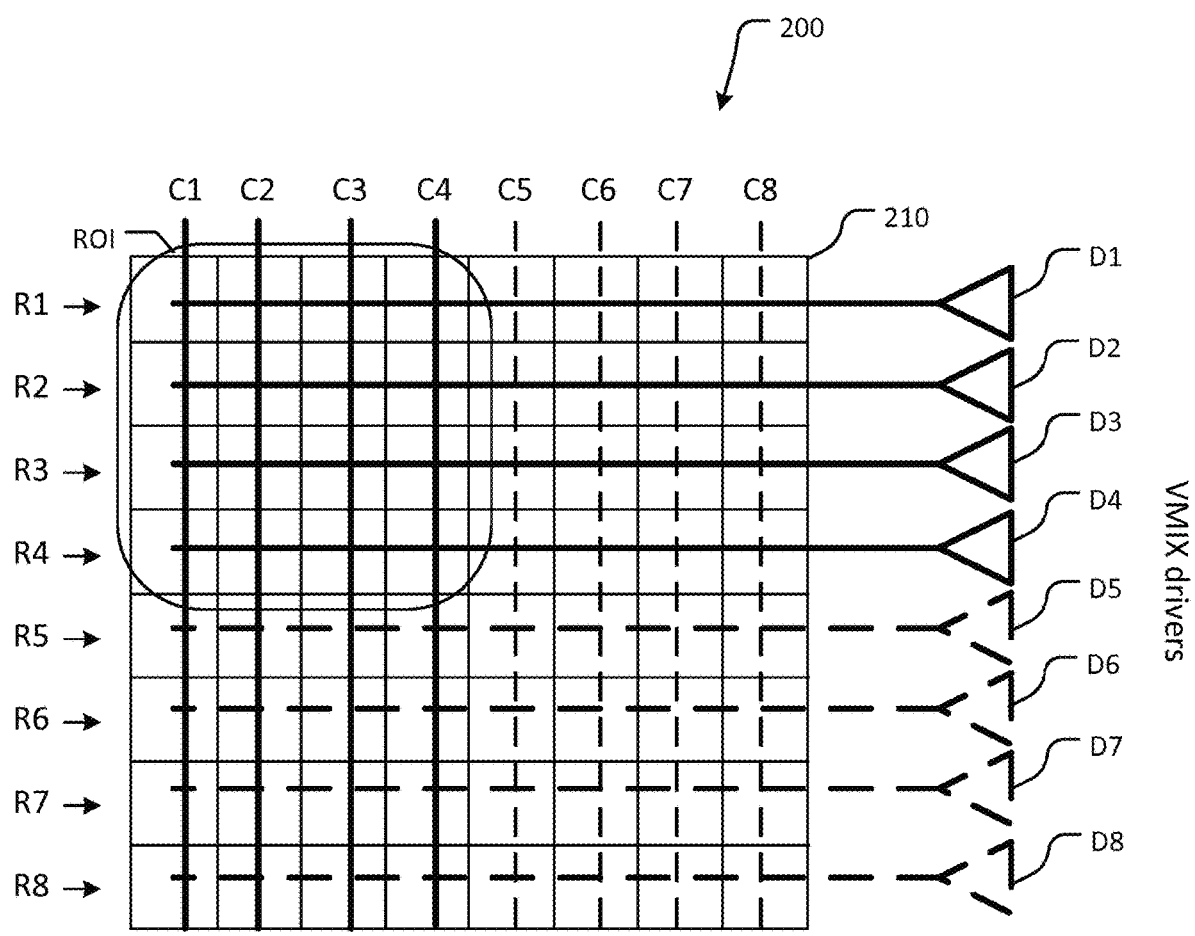
FIG. 2 illustrates schematically an embodiment of a pixel array of an imaging sensor with distributed pixel modulation drivers and column enable lines.

FIG. 2 illustrates schematically an embodiment of a pixel array of an imaging sensor with distributed pixel modulation drivers and column enable lines. The imaging sensor 200 comprises eight pixel modulation drivers, VMIX drivers D1 to D8, eight VMIX column enable lines C1 to C8, and a pixel array 210. Each of the eight VMIX drivers D1 to D8 provides a respective demodulation signal (VMIX) to a dedicated pixel row R1 to R8 via a specific VMIX line drive line. The pixel rows R1 to R8 are a sub-array of the pixel array 210 that groups the pixel which are connected to the respective VMIX line drive line. The eight VMIX column enable lines C1 to C8 are connected to respective pixel columns of the pixel array 210 and activate or deactivate the respective pixels of a column (see FIG. 3). In FIG. 2, four VMIX column enable lines C1, C2, C3, C4 and four VMIX drivers D1, D2, D3, D4 are active. Therefore, a region of interest RoI of the pixel array 210 is active to correlate the demodulation signal generated by the respective VMIX drivers with a reflected light collected in the respective pixels. The remaining pixels are "off". The region of interest RoI may also be referred as a spot ToF Region of Interest (RoI). In this embodiment, the number of VMIX drivers is equal to the number of pixel rows in the pixel array. For instance, for a quarter video graphics array (QVGA) resolution 240 individual VMIX drivers are provided (or 320 drivers in case per column drive). However, the number of VMIX drivers are not restricted to the number of pixel rows/column, e.g. one driver per two rows/columns may be used.

Figure 3:
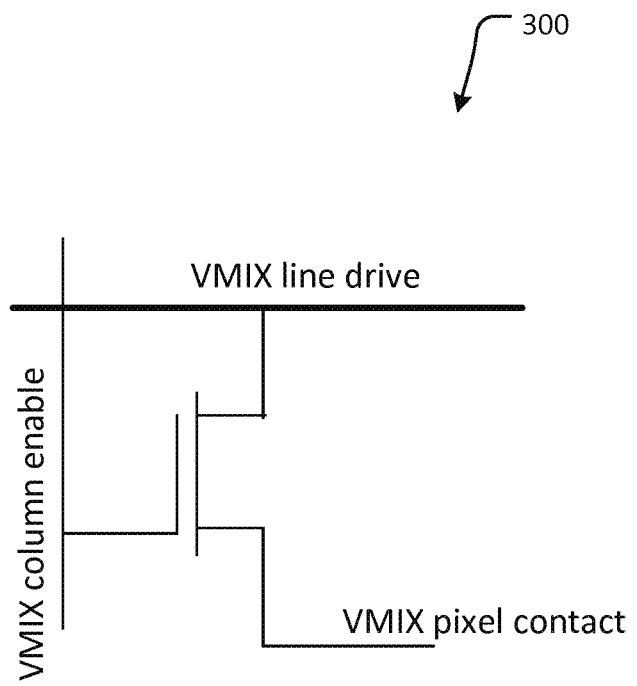
FIG. 3 shows an embodiment of circuitry for activating or deactivating a pixel of the pixel array of FIG. 2.

FIG. 3 shows an embodiment of circuitry for activating or deactivating a pixel of the pixel array of FIG. 2. For each pixel, an N type metal-oxide-semiconductor field-effect transistor 300 (MOSFET) which acts as a switch is provided to activate or deactivate the respective pixel in accordance with the VMIX column enable signal. The drain of the MOSFET 300 is connected to the respective VMIX line drive, the gain of the MOSFET 300 is connected to the respective VMIX column enable, and the source of the MOSFET 300 is connected to the respective VMIX pixel contact. The MOSFET 300 delivers the VMIX signal to the corresponding pixel when an enable signal is received at the gate through VMIX column enable.

Figure 4A:
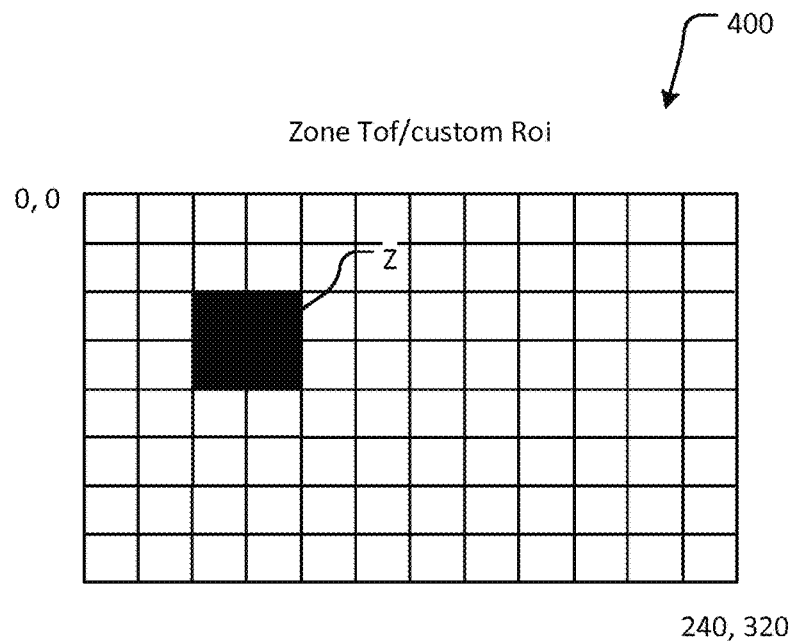
FIG. 4A illustrates schematically an embodiment of an imaging sensor with a rectangular Region of Interest (RoI)

FIG. 4A illustrates schematically an embodiment of an imaging sensor with a rectangular Region of Interest (RoI). The imaging sensor 400 is a QVGA resolution pixel array which has 240 rows and 320 columns (not all shown in FIG. 4A). The pixels are driven by 240 VMIX drivers and controlled by 320 VMIX column enables (not shown in FIG. 4A). By activating the respective drivers and the column enables, a region of interest RoI of the pixel array is activated and forms a rectangular RoI. The selected pixels (region of interest RoI) are correlated with a demodulation signal generated by the respective drivers and with reflected light captured at the respective pixels.

Figure 4B:
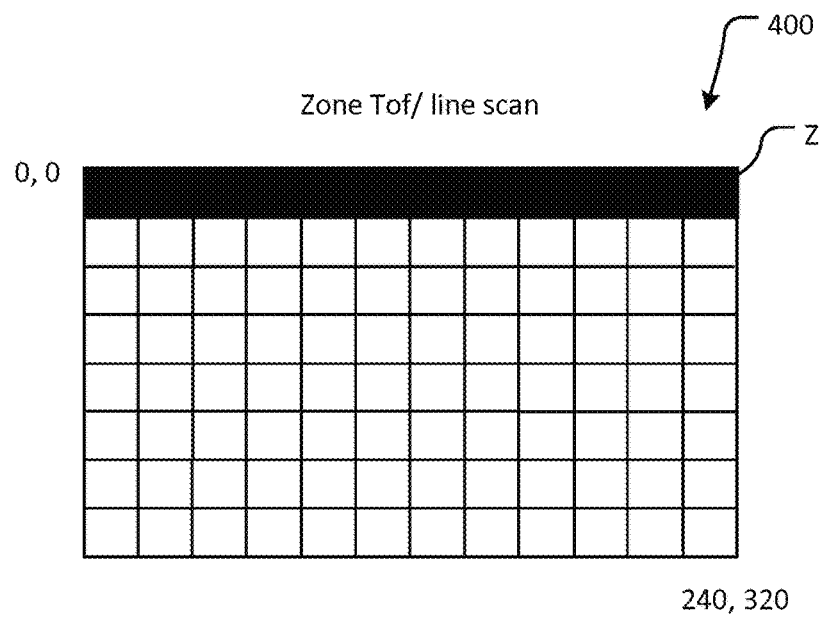
FIG. 4B illustrates schematically an embodiment of an imaging sensor that is configured for line scan.

FIG. 4B illustrates schematically an embodiment of an imaging sensor that is configured for line scan. The imaging sensor 400 is a QVGA resolution pixel array which has 240 rows and 320 columns (not all shown in FIG. 4A). The pixels are driven by 240 VMIX drivers and controlled by 320 VMIX column enables (not shown in FIG. 4A). By activating the respective drivers and the column enables, a region of interest RoI of the pixel array is activated and forms a line RoI. By line-by-line activation of the drives, a line scan of the image sensor 400 may be performed.

A rectangular RoI and a line RoI is shown in FIG. 4A and FIG. 4B, however, the embodiment is not limited to the shape of the RoI various customized RoI may be used to demodulate the pixel array 400.

Figure 5:
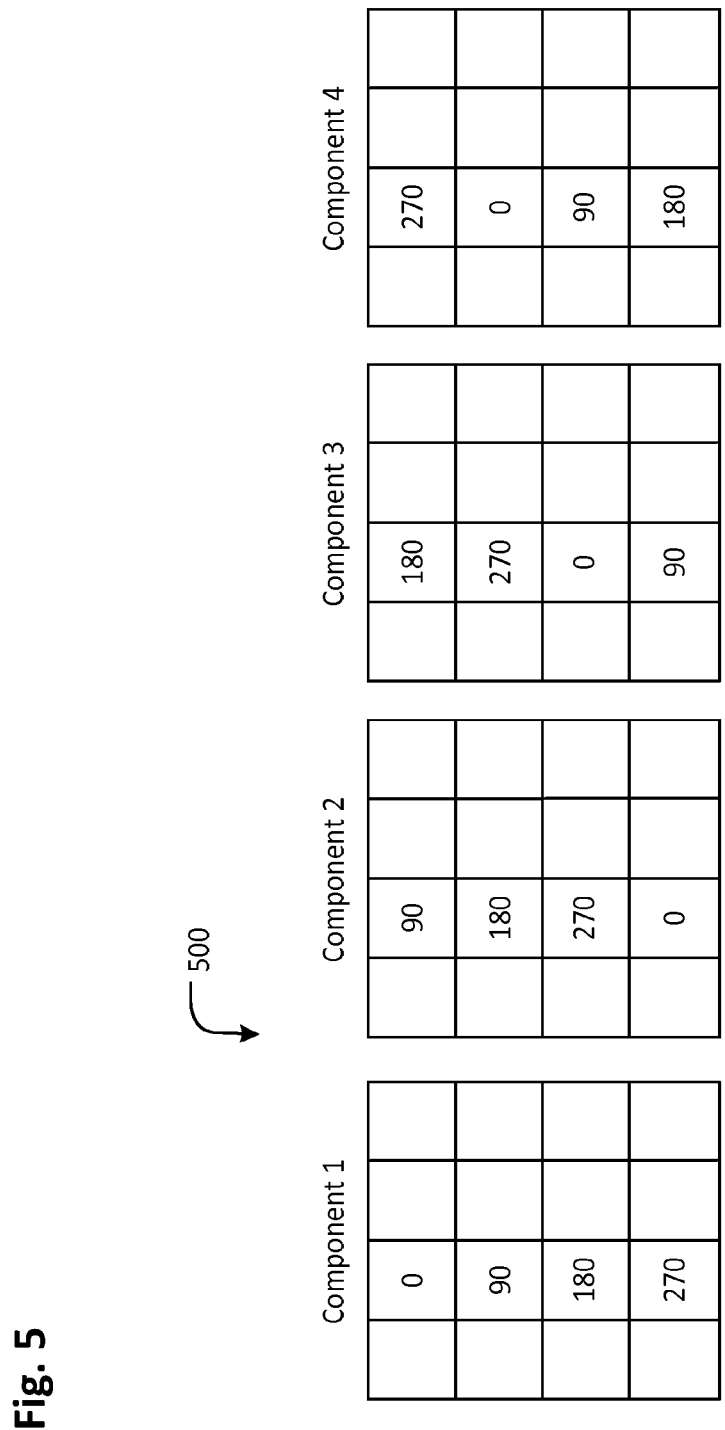
FIG. 5 illustrates schematically an embodiment of a process of component acquisition using an imaging sensor as described in FIG. 2 above.

FIG. 5 illustrates schematically an embodiment of a process of component acquisition using an imaging sensor as described in FIG. 2 above. For illustration purpose, in this embodiment, the imaging sensor 500 is a 4×4 pixel array. Each of the rows is driven by a demodulation signal generated by a respective VMIX driver. In a first stage of the process, a first component is acquired at each pixel.

In the first phase, the first row acquires components with a demodulation signal with 0° phase shift, the second row acquires components with a demodulation signal with 90° phase shift, the third row acquires components with a demodulation signal with 180° phase shift and the fourth row acquires components with a demodulation signal with 270° phase shift. In a second stage of the process, the first row acquires components with a demodulation signal with 90° phase shift, the second row acquires components with a demodulation signal with 180° phase shift, the third row acquires components with a demodulation signal with 270° phase shift and the fourth row acquires components with a demodulation signal with 0° phase shift. In a third stage of the process, the first row acquires components with a demodulation signal with 180° phase shift, the second row acquires components with a demodulation signal with 270° phase shift, the third row acquires components with a demodulation signal with 0° phase shift and the fourth row acquires components with a demodulation signal with 90° phase shift. In a fourth stage of the process, the first row acquires components with a demodulation signal with 270° phase shift, the second row acquires components with a demodulation signal with 0° phase shift, the third row acquires components with a demodulation signal with 90° phase shift and the fourth row acquires components with a demodulation signal with 180° phase shift.

Here, as phases are applied with 90° shift for the next component acquisition, full depth ToF frame can be acquired with a constant phase of the illumination signal. This four phase driving example (per row groups) allows a peak current and, simultaneously, a switching noise reduction.

By applying four demodulation signals with 90° phase shift in each component, a peak current may be reduced. For example, the phase difference between the first component and the third component is always 180° for all pixels, therefore the required peak current for driving the respective drivers is reduced by factor of two. At the same time, depth calculation may be the same as in case of full area phase per component, there is no changes in algorithm.

Figure 6:
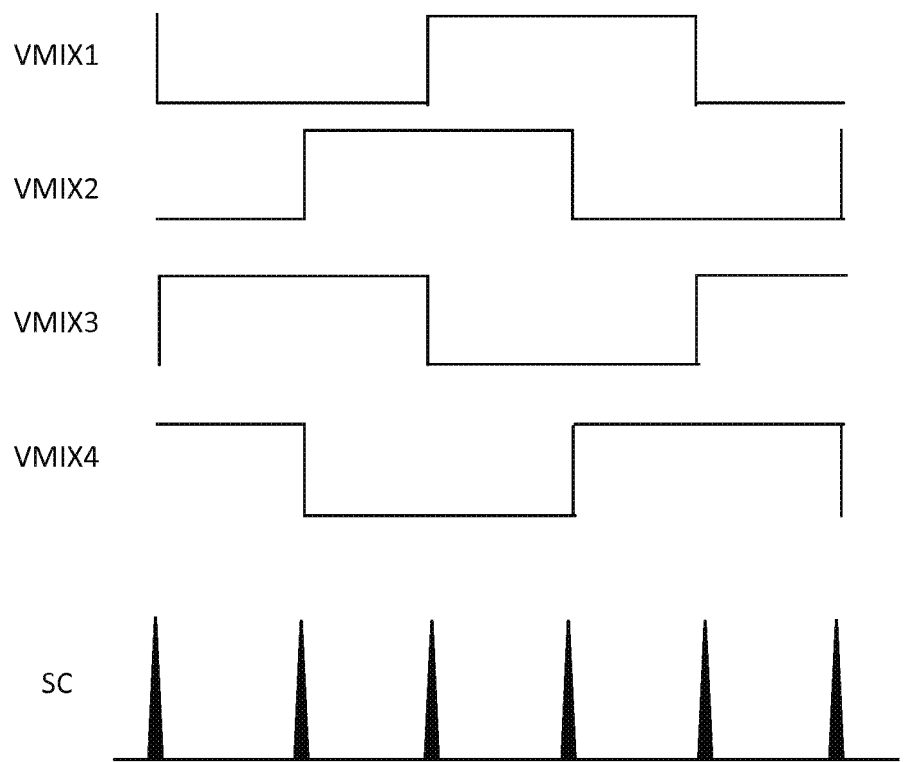
FIG. 6 illustrates schematically an embodiment of a timing diagram of demodulation signals applied to the VMIX drivers and a timing diagram of a switching current.

FIG. 6 illustrates schematically an embodiment of a timing diagram of demodulation signals applied to the VMIX drivers and a timing diagram of a switching current. The demodulation signals VMIX1, VMIX2, VMIX3, VMIX4 each are a 50% duty cycle square wave. The first demodulation signal VMIX1 represents a demodulation signal with 0° phase shift, the second demodulation signal VMIX2 represents a demodulation signal with 90° phase shift, the third demodulation signal VMIX3 represents a demodulation signal with 180° phase shift and the fourth demodulation signal VMIX4 represents a demodulation signal with 270° phase shift. The demodulation signals may for example have an amplitude of 10 Ampere and a frequency from e.g. 10 MHz to 100 MHz. At the bottom of FIG. 6, the resulting switching current SC is shown. The switching current is four times smaller than the switching current when an image sensor is driven with a common demodulation signal. The amplitude of the switching current decreases according to the number of phases. This embodiment allows to drive whole array (or selected RoI) with multi-phase modulation signal which will distribute switching moment of multiple drivers in time and reduce peak switching current by factor equal to number of phases.

Spot Time-Of-Flight Camera Subsampling

Figure 7:
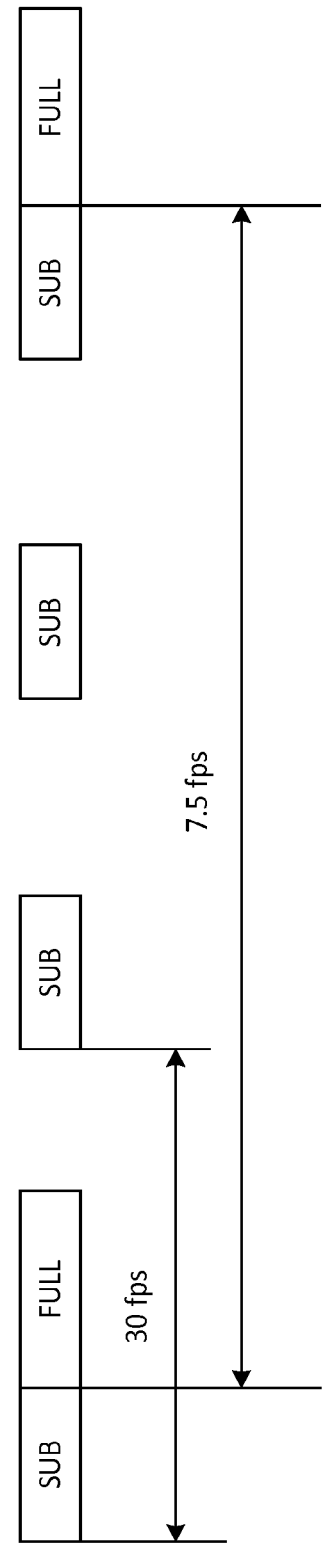
FIG. 7 illustrates schematically an embodiment of a timing diagram for a read-out mode of an imaging sensor.

FIG. 7 illustrates schematically an embodiment of a timing diagram for a read-out mode of an imaging sensor. The imaging sensor has two different read-out modes, a first read-out mode SUB and a second read-out mode FULL. In the full read-out mode the entire pixel array of the imaging sensor is demodulated with a demodulation signal and read out. The full read-out mode has a full resolution and may capture static and fine objects of a scene. The sub read-out mode may be captured with a higher frame rate and may thus be robust against motion and may capture a coarse scene.

In the sub read-out mode only a specific part of the pixel array is demodulated with a demodulation signal and read out. For example, with 40×30 spots Diffractive Optical Elements (DOE) (each spot of 8×8 pixels) and a QVGA sensor (320×240 pixels), in the sub read-out mode, half of the columns and rows may be skipped. Therefore, the resolution for sub-read out may be 80×60 and the VMIX power may be saved by 75% and the switching power (ADC power) for the column enable lines may be saved by 50%. Further, the motion blur effect may be decreased.

The sub read-out mode is taken with a high frame rate, here a 30 fps stream (fps=frames per second), and the full read-out mode is taken with a low frame rate, here a 7.5 fps. With a ratio of 1:4 fps between full read mode and sub-read mode, the power required for the VMIX drivers is saved by 75% and the switching power (ADC power) required for activating or deactivating column enable lines is saved by 50% when the illumination spot size is about the distance between the spots (the saving increases with reduced spot fill factor). Therefore, a power required for the imaging sensor may be reduced and the the motion blur effect may be reduced. Further, the read-out time may be at least twice faster and even more if Mobile Industry Processor Interface Alliance (MIPI) or other data Interface is limiting factor for full array read-out.

A ratio of 1:4 fps between full read mode and sub-read mode is shown in this embodiment, however, the embodiment is not limited to the read out frame speed, for example the low fps stream may be 4 to 10 slower than the high fps stream.

Figure 8:
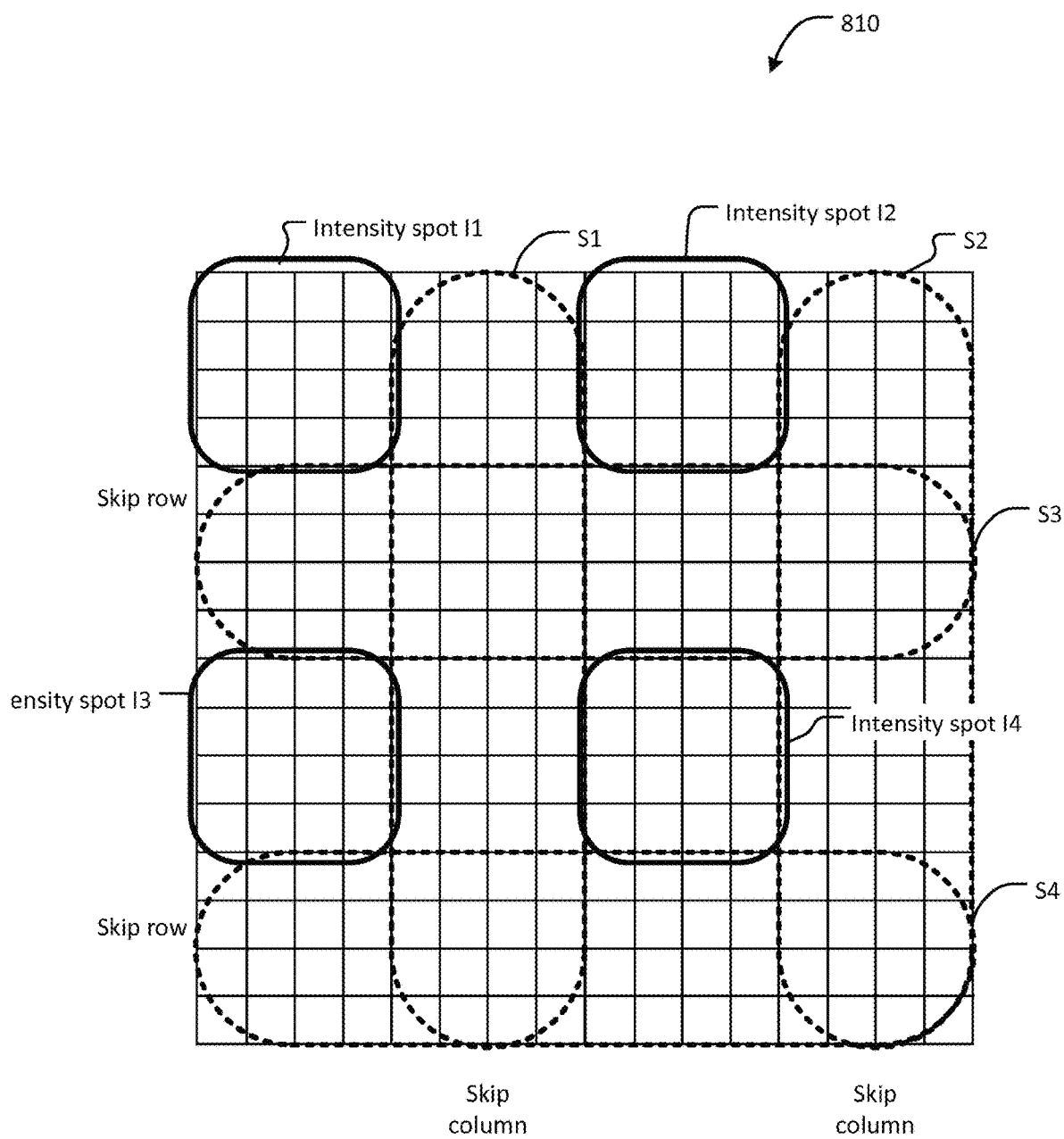
FIG. 8 illustrates schematically a further example of a sub read-out mode for spot subsampling.

FIG. 8 illustrates schematically a further example of a sub read-out mode for spot subsampling. In the sub read-out mode four high intensity spots I1, I2, I3, I4 are read out. Pixels in the remaining rows S3, S4 and columns S1, S2 are skipped. The intensity spots I1, I2, I3, I4 are group of pixels that receive reflected light with a high intensity. The intensity spots I1, I2, I3, I4 may be continuously adjusted from a live stream data based on signal strength from different pixels. In particular, the position and the shape of the intensity spots may be determined at a lower frame rate based on data received during the full read-out mode (that is, the data from full resolution frame is used to determine the RoI).

The embodiment of FIG. 8 describes a dynamic sub read-out process, where the light intensity is continuously obtained for each pixel. In alternative embodiments, the subsampling pattern may be fixed, i.e. determined once during camera calibration, e.g. at manufacturing. In both cases, the data from full resolution frame is used to determine the RoI, a confidence filter (or equivalent) may be applied to detect the subsampling area, e.g. where the obtained light intensity in pixel is above a threshold.

It should be recognized that the embodiments describe methods with an exemplary ordering of method steps.

A method for controlling an electronic device, discussed above, can also be implemented as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device (200) comprising an array of pixels (210; 400; 500; 810), and pixel modulation drivers (D1 to D8), each pixel modulation drivers (D1 to D8) being configured to drive a sub-array (R1 to R8) of the pixels.

(2) The electronic device (200) of (1), wherein each pixel sub-array (L1, L2, . . . , L8) receives an individual demodulation signal (VMIX1, VMIX2, VMIX3, VMIX4) and each pixel of a sub-array (R1 to R8) is controlled with an individual enable control signal.

(3) The electronic device (200) of (1) or (2), wherein the sub-arrays (R1 to R8) of the pixels correspond to the rows or columns of the array of pixels (210; 400; 500; 810).

(4) The electronic device (200) of anyone of (1) to (3), wherein the sub-arrays (R1 to R8) of the pixels correspond to 2×2 pixel arrays.

(5) The electronic device (200) of anyone of (1) to (4), wherein dedicated pixel modulation driver (D1 to D8) allows to drive any rectangular region of interest (RoI) or regular region of interest matrix.

(6) The electronic device (200) of anyone of (1) to (5), wherein enable lines (C1 to C8) are provided for enabling or disabling pixels of the array of pixels (210; 400; 500; 810).

(7) The electronic device (200) of anyone of (1) to (6), wherein column enable lines (C1 to C8) are provided for enabling or disabling pixels of a specific pixel column.

(8) The electronic device (200) of anyone of (1) to (7), wherein the pixel modulation drivers (D1 to D8) are configured to generate a demodulation signal (VMIX1, VMIX2, VMIX3, VMIX4).

The modulation signal may for example be a square wave with a frequency of 10 to 100 MHZ.

(9) The electronic device (200) of anyone of (1) to (8), wherein the pixel modulation drivers (D1 to D8) are arranged to drive the sub-array (R1 to R8) according to a multiphase driving scheme.

(10) The electronic device (200) of anyone of (1) to (9), wherein the pixel modulation drivers (D1 to D8) are arranged to drive the sub-arrays (R1 to R8) with demodulation signals (VMIX1, VMIX2, VMIX3, VMIX4) having a different phase offset.

(11) The electronic (200) device of anyone of (1) to (10), wherein the electronic device provides a sub-readout mode in which one or more sub-arrays (R1 to R8) of the array of pixel (210; 400; 500; 810) are read out.

(12) The electronic (200) device of (11), wherein the sub read-out mode is configured to provide a spot (I1, I2, I3, I4) subsampling.

(13) The electronic (200) device of (11) or (12), wherein the sub read-out mode is configured to subsample a sub-array (R1 to R8) of the array of pixels (210; 400; 500; 810) where a high intensity of light is received.

(14) The electronic (200) device of anyone of (11) to (13), wherein the electronic device (200) further provides a full readout mode in which the entire array of pixels (210; 400; 500; 810) is read out.

(15) The electronic device (200) of (14), wherein sub read-out mode has a higher frame rate than the full read-out mode.

(16) The electronic device (200) of (2), wherein the electronic device further comprises switches (300) that are connected to respective pixels, each switches being controlled by a respective column enable signal and each switch (300) connecting or disconnecting the respective pixel to or from a respective pixel modulation driver (D1 to D8).

(17) The electronic device (200) of anyone of (1) to (16), wherein the image sensor has a QVGA pixel array.

(18) The electronic device (200) of anyone of (1) to (17), wherein the electronic device (200) is an imaging sensor for a time-of-flight camera.

(19) A time-of-flight camera comprising the electronic device (200) of (1).

(20) A method of driving an electronic device (200) comprising an array of pixels (210; 400; 500; 810) and pixel modulation drivers (D1 to D8), the method comprising driving, with each of the multiple pixel modulation drivers (D1 to D8), a respective sub-array (R1 to R8) of the pixels.

(21) A computer program comprising program code causing a computer to perform the method of (19), when being carried out on a computer.

(22) A non-transitory computer-readable recording medium that stores therein a computer program product, which, when executed by a processor, causes the method of (19) to be performed.

The invention claimed is:

1. An electronic device comprising:
an array of pixels;
pixel modulation drivers, each pixel modulation driver being configured to drive a sub-array of the array of pixels, wherein the sub-array includes a group of pixels within the array of pixels, and wherein each pixel sub-array is configured to receive an individual demodulation signal and each pixel of a sub-array is configured to be controlled with an individual column enable control signal; and
switches connected to respective pixels of the array of pixels, each switch configured to be controlled by the respective individual column enable control signal and each switch configured to connect or disconnect the respective pixel to or from a respective pixel modulation driver.

2. The electronic device of claim 1, wherein the sub-arrays of the pixels correspond to rows or columns of the array of pixels.

3. The electronic device of claim 1, wherein the sub-arrays of the pixels correspond to 2×2 pixel arrays.

4. The electronic device of claim 1, further comprising a dedicated pixel modulation driver configured to drive any rectangular region of interest (RoI) or a regular region of interest matrix of the array of pixels.

5. The electronic device of claim 1, wherein enable lines are provided for enabling or disabling pixels of the array of pixels.

6. The electronic device of claim 1, wherein column enable lines are provided for enabling or disabling pixels of a specific pixel column.

7. The electronic device of claim 1, wherein the pixel modulation drivers are configured to generate a demodulation signal.

8. The electronic device of claim 1, wherein the pixel modulation drivers are arranged to drive the sub-array according to a multiphase driving scheme.

9. The electronic device of claim 1, wherein the pixel modulation drivers (D1 to D8) are arranged to drive the sub-arrays with demodulation signals having a different phase offset.

10. The electronic device of claim 1, wherein the electronic device provides a sub-readout mode in which one or more sub-arrays of the array of pixel are read out.

11. The electronic device of claim 1, wherein the image sensor has a QVGA pixel array.

12. The electronic device of claim 1, wherein the electronic device is an imaging sensor for a time-of-flight camera.

13. A time-of-flight camera comprising the electronic device of claim 1.

14. The electronic device of claim 10, wherein the sub read-out mode is configured to provide a spot subsampling.

15. The electronic device of claim 10, wherein the sub read-out mode is configured to subsample a sub-array of the array of pixels where a high intensity of light is received.

16. The electronic device of claim 10, wherein the electronic device further provides a full readout mode in which the entire array of pixels is read out.

17. The electronic device of claim 16, wherein sub read-out mode has a higher frame rate than the full read-out mode.

18. A method of driving an electronic device comprising an array of pixels and pixel modulation drivers, the method comprising driving, with each of the pixel modulation drivers, a respective sub-array of the pixels, wherein the sub-array includes a group of pixels within the array of pixels, and wherein each pixel sub-array is configured to receive an individual demodulation signal and each pixel of a sub-array is configured to be controlled with an individual column enable control signal; and
providing respective column enable signals to switches connected to respective pixels of the array of pixels, each switch configured to be controlled by the respective individual column enable control signal and each switch configured to connect or disconnect the respective pixel to or from a respective pixel modulation driver.

* * * * *